April 20, 1965 W. BUNKER 3,179,017
PEDAL MOUNT
Filed April 26, 1963 2 Sheets-Sheet 1
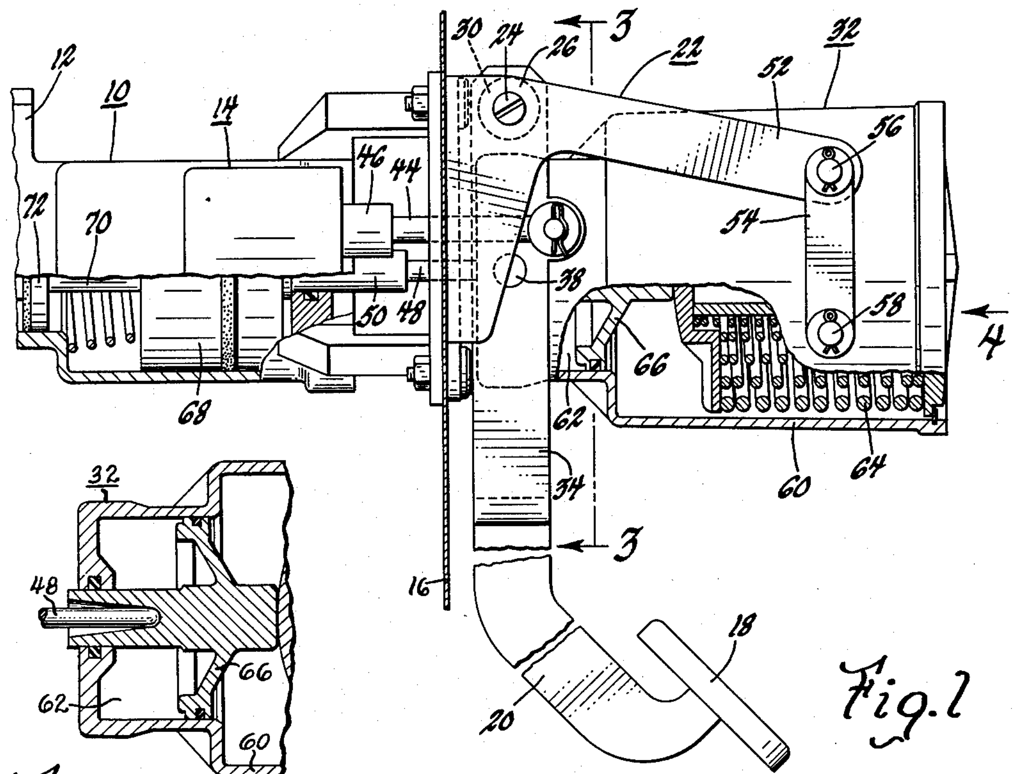
Fig. 1
Fig. 1a
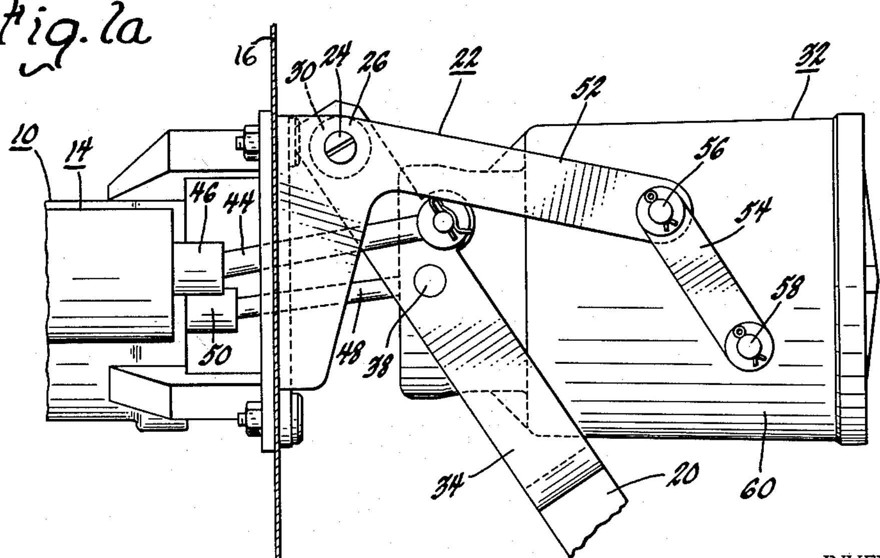
Fig. 2
INVENTOR.
Ward Bunker
BY
D. D. McGraw
HIS ATTORNEY April 20, 1965 W. BUNKER 3,179,017
PEDAL MOUNT
Filed April 26, 1963 2 Sheets-Sheet 2
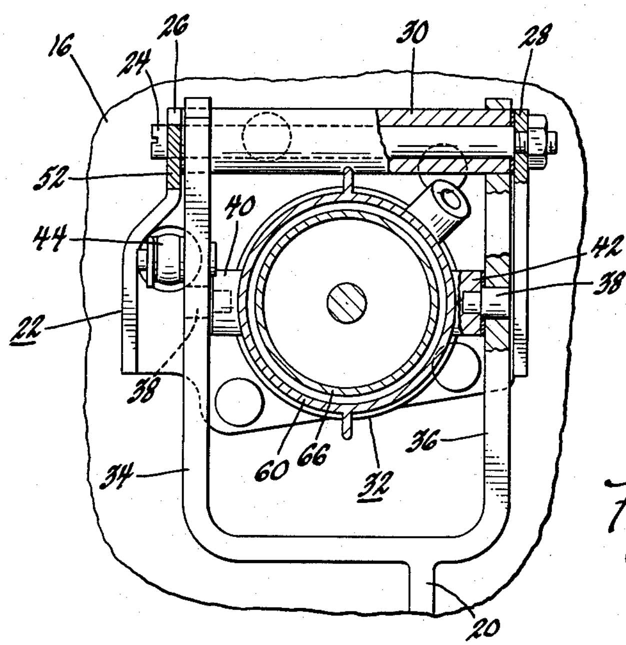
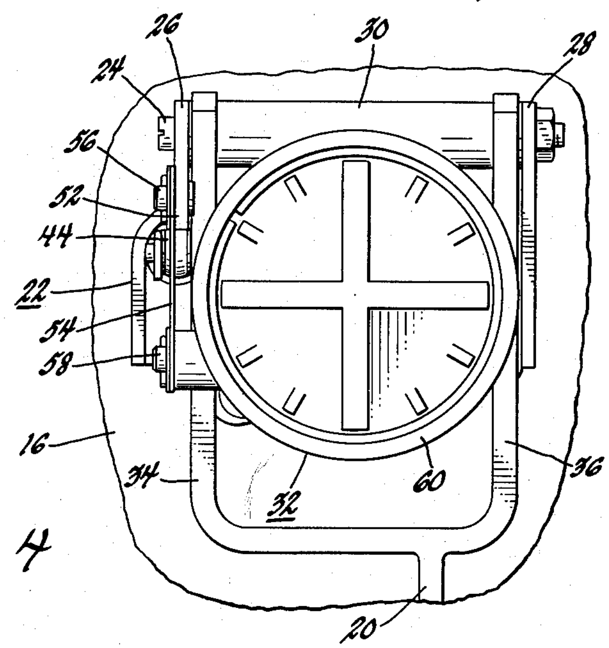
INVENTOR.
Ward Bunker
BY D. D. McGrant
HIS ATTORNEY United States Patent Office 3,179,017
Patented Apr. 20, 1965

3,179,017

PEDAL MOUNT

Ward Bunker, Dayton, Ohio, assignor to General Motors Corporation, Detroit, Mich., a corporation of Delaware Filed Apr. 26, 1963, Ser. No. 275,970
4 Claims. (Cl. 91—391)

The invention is directed to the mounting of a pedal raising mechanism for a power brake so that the brake pedal is in a low position when the power brake is operative but is raised to a high position when there is insufficient power available to operate the brake. A hydraulic power brake system in which the invention is utilized may include the power unit for actuating the master cylinder assembly and a valve assembly for controlling the power brake. The valve assembly in some systems may also include valving affecting the pedal raising mechanism.

A brake system in which the mechanism embodying the invention may be utilized is disclosed and claimed in copending application S.N. 275,834, entitled "Vehicle Brake System" and filed April 26, 1963, in the name of Robert M. Van House. Reference is therefore made to this application for a detailed understanding of the functioning of such a system and the disclosure is incorporated herein by reference as if fully reproduced.

In order to provide a pedal raising device with a power brake unit the connecting linkages must be so arranged that the control valving is in position to be controlled by slight movement of the brake pedal, and when the brake is to be manually actuated, the pedal is to be raised sufficiently far from the vehicle floorboard to permit a pedal stroke of the desired amount. The pedal must be mechanically connected under these circumstances so that the manual force is mechanically transmitted to the master cylinder to pressurize the brake lines. This is preferably accomplished without requiring the brake pedal force to overcome a partial fluid block in the power unit. The mechanism for raising the pedal should be sensitive to the loss of power boost pressure so that the pedal is automatically raised when such loss occurs.

In providing a power unit with a stationary housing, it has been found to be desirable to provide a pedal raising mechanism which includes a housing containing a servomotor and a spring pack, with the housing being attached to the pedal arm and movable when the pedal moves from the low position to the high position, and vice versa. While the housing may simply be pivoted about the same axis as the pedal arm it is desirable to maintain as near a linear movement of the pedal raising mechanism housing as possible in order to maintain better alignment in the force transmitting members between the brake pedal arm and the master cylinder. This invention is concerned with the particular mounting arrangement of such a system.

In the drawings:

FIGURE 1 is a side elevation with parts broken away of a portion of a power brake unit embodying the invention and showing the brake pedal in the low pedal position.

FIGURE 1*a* is a partial section view of a portion of the mechanism of FIGURE 1, with parts broken away.

FIGURE 2 is similar to FIGURE 1 but showing the brake pedal arm in the high pedal position.

FIGURE 3 is a cross section view of the mechanism of FIGURE 1 taken in the direction of arrows 3—3 of that figure.

FIGURE 4 is an end view of the mechanism of FIGURE 1 taken in the direction of arrow 4 of that figure.

The system in which the invention is embodied includes a power unit assembly 10 which is connected to or assembled in the same housing with the master cylinder assembly 12. A booster valve assembly 14 is provided to control the power unit assembly 10. These assemblies are mounted on a suitable portion of the vehicle such as the firewall 16 and suitable brake line conduits are provided on the vehicle brakes from the master cylinder assembly. A brake pedal 18 on a pedal arm 20 is pendantly mounted on the vehicle and so positioned that the vehicle operator can actuate the vehicle brakes by pressing downwardly on pedal 18. The pedal mount includes the bracket 22 which may also be secured to the firewall 16, and the pivot shaft 24 which is rotatably received through the flanges 26 and 28 of bracket 22. A shaft supporting cylinder 30 may be secured to flanges 26 and 28 to additionally support pedal arm 20. As is better seen in FIGURES 3 and 4, pedal arm 20 may be bifurcated to pass on either side of the pedal raising mechanism 32, and then extend to the pedal 18 as a single arm. The pedal arm bifurcations 34 and 36 are provided with suitable pivot studs 38 which fit into bosses 40 and 42 on opposite sides of pedal raising mechanism 32 so that the forward end of the mechanism 32 is pivotally secured to the pedal arm 20 about a pivotal axis parallel to the axis of shaft 24. Bifurcation 34 of arm 20 has the push rod 44 pivotally attached thereto and extending into a suitable recess in plunger 46. Movement of this plunger controls the valving in the booster valve assembly 14 to actuate the power booster in the manner described in the above noted applications. The pedal raising mechanism 32 also has a push rod 48 extending therefrom for actuating the plunger 50 of the power unit 10 to mechanically actuate the vehicle brakes in the manner described in the above noted application. As shown in FIGURE 1*a*, rod 48 engages piston 66 to provide reaction for the movement of housing 60 when the pedal raising mechanism 32 is operated to raise the pedal 18.

The bracket 22 has a rearwardly and slightly downwardly extending arm 52 to the end of which is pivotally attached a control link 54. One end of link 54 receives pivot 56 of bracket arm 52 and the other end receives pivot 58 of the pedal raising mechanism 32. In the position shown in FIGURE 1 the pedal arm 20 is substantially vertical so that the pedal 18 is in the low position. The pedal arm bifurcations, the housing 60 of pedal raising mechanism 32, bracket arm 52 and link 54 cooperate to define a parallelogram type support for the pedal raising mechanism 32 so arranged that the pedal raising mechanism 32 is translated between the position of FIGURE 1 and the position of FIGURE 2 while remaining substantially horizontal. This position occurs when the pressure in chamber 62 of the mechanism 32 is exhausted so that the spring pack 64 forces the piston 66 to the left. As seen in FIGURE 2, this transmits forces through the push rod 48 and the plunger 50 to move the servo housing 60 to the right. The resulting counterclockwise movement of pedal arm 20 results in a partial withdrawal of the push rod 44 relative to the plunger 46 of the booster valve assembly so that brake actuating force exerted on the pedal 18 does not cause the valving in the booster valve assembly 14 to be moved. Instead, when the operator depresses pedal 18, pedal arm 20 pivots clockwise about the axis of shaft 24 and the pedal force is transmitted through pivot studs 38 to the housing 60 of mechanism 32. This force is in turn transmitted through the spring pack 64, the piston 66, push rod 48 and the plunger 50 to the power piston 68. This piston in turn mechanically transmits the force through the push rod 70 to the master cylinder piston 72 which acts to pressurize the brake lines in the usual manner.

When pressure is again supplied to chamber 62, it acts on piston 66 to compress spring pack 64 and the unbalanced weight of the mechanism 32 as well as the pedal 18 and pedal arm 20 act about the axis of shaft 24 to pivot the assembly back to the position shown in FIGURE 1. In this position the push rod 44 is poised to actuate the plunger 46 of the booster valve assembly while the push rod 48 has been withdrawn due to movement of piston 66 a sufficient amount so as not to be able to transmit mechanical forces to plunger 50 within the operating range of movement of plunger 46 to operate the valve assembly 14.

I claim:

1. An adjustable position pedal arm mounting mechanism comprising, a pedal arm positioning servomotor having a housing, a bracket having an arm, a pedal arm pivotally attached to said bracket at one end of said arm, a link pivotally attached to said bracket at the other end of said arm and extending generally parallel to said pedal arm, and said pedal arm positioning servomotor housing pivotally attached to said pedal arm and said link for translatory movement.

2. A pedal arm raising and lowering mechanism for a pendant pedal, said mechanism comprising a servomotor having a housing and an output member, a bracket having first and second spaced pivots thereon, a pedal arm pivotally mounted to one of said pivots and to said housing, a link pivotally mounted to the other of said pivots and to said housing, said housing being translatably movable upon actuation of said servomotor and reacting through said output member to pivot said pedal arm on said bracket and selectively position said pedal arm in raised and lowered positions.

3. A pedal positioning mechanism in a brake system having a brake pedal arm and a pedal mounted thereon and a push rod pivotally attached to said pedal arm for controlling actuation of a power brake booster, a bracket pivotally mounting said pedal arm in a pendant position, a link pivotally mounted on said bracket in generally parallel relation to said pedal arm, a pedal positioning servomotor having a housing pivotally mounted to said pedal arm and said link in generally parallel relation to said bracket, a servomotor output member providing a servomotor reaction so that servomotor action moves said servomotor housing in a translatory manner to pivot said pedal arm on said bracket and hold said pedal arm and said pedal selectively in raised and lowered positions, one of said positions rendering said pedal arm output member operative to control said power brake and the other of said positions rendering said servomotor output member operative to manually actuate the brake system in accordance with force exerted on said pedal causing said pedal arm to pivot on said bracket.

4. In a hydraulic power brake system having a power booster controllable by a valve assembly and means for manually actuating the brake system, a brake pedal arm having a push rod for controlling the valve assembly, a hydraulically actuated servomotor for selectively positioning the pedal arm in a valve assembly controlling position and a manual brake system control position and including a housing pivotally attached to said pedal arm, a bracket pivotally mounting said pedal arm, and a link pivotally mounted to said bracket and to said servomotor housing, said pedal arm and said bracket and said link and said servomotor housing cooperating to form a parallelogram pedal arm positioning linkage.

References Cited by the Examiner

UNITED STATES PATENTS

| | | | |
|---|---|---|---|
| 2,706,020 | 4/55 | Freers et al. | 188—152.44 |
| 2,910,147 | 10/59 | Fishtahler et al. | 188—152.44 |
| 3,063,427 | 11/62 | Hill | 91—391 |
| 3,103,854 | 9/63 | Price et al. | 91—391 |

FRED E. ENGELTHALER, *Primary Examiner.*